(12) United States Patent
Baraff

(10) Patent No.: US 7,911,469 B1
(45) Date of Patent: Mar. 22, 2011

(54) POSE-BASED COLLISION FLY-PAPERING: A METHOD FOR SIMULATING OBJECTS IN COMPUTER ANIMATION

(75) Inventor: David Baraff, Oakland, CA (US)

(73) Assignee: Pixar, Emeryville, CA (US)

( * ) Notice: Subject to any disclaimer, the term of this patent is extended or adjusted under 35 U.S.C. 154(b) by 886 days.

(21) Appl. No.: 11/753,792

(22) Filed: May 25, 2007

Related U.S. Application Data

(60) Provisional application No. 60/812,310, filed on Jun. 8, 2006.

(51) Int. Cl.
*G06T 13/00* (2006.01)
(52) U.S. Cl. ......... 345/474; 345/419; 345/420; 345/473
(58) Field of Classification Search .................. None
See application file for complete search history.

(56) References Cited

U.S. PATENT DOCUMENTS

| | | |
|---|---|---|
| 5,594,856 A | 1/1997 | Girard |
| 5,892,691 A | 4/1999 | Fowler |
| 5,912,675 A | 6/1999 | Laperriere |
| 5,982,390 A | 11/1999 | Stoneking et al. |
| 6,144,385 A | 11/2000 | Girard |
| 6,326,963 B1 | 12/2001 | Meehan |
| 6,559,849 B1 | 5/2003 | Anderson et al. |
| 6,720,962 B1 | 4/2004 | Alter |
| 6,738,065 B1 | 5/2004 | Even-Zohar |
| 6,909,431 B1 | 6/2005 | Anderson et al. |
| 7,385,603 B2 * | 6/2008 | Piponi ........................ 345/423 |
| 2002/0118197 A1 * | 8/2002 | Baraff et al. ................ 345/474 |
| 2004/0075662 A1 * | 4/2004 | Baraff et al. ................ 345/473 |
| 2005/0159904 A1 * | 7/2005 | Loose et al. ................. 702/45 |

OTHER PUBLICATIONS

Baraff, D., Witkin, A. and Kass, M., Untangling Cloth, 2003, ACM Transactions on Graphics, Proceedings of ACM SIGGRAPH 2003, vol. 22, No. 3, pp. 862-870.*
Ascher et al. "On the Modied Conjugate Gradient Method in Cloth Simulation" (submitted to) The Visual Computer, 2002, 19: 526-531.
Baraff et al., "Global Methods for Simulating Contacting Flexible Bodies" IEEE 1994, pp. 1-12.
Baraff et al., "Large Step in Cloth Simulation" SIGGRAPH 98, Orlando, FL, Jul. 19-24, 1998, Computer Graphics Proceedings, Annual Conference Series, pp. 43-54.
Berney et al. "Stuart Little," SIGGRAPH 2000 Course Notes, ACM SIGGRAPH, ch. Costumes.
Breen et al., "Predicting the Drape of Woven Cloth Using Interacting Particles," Computer Graphics 1994 (Proc. SIGGRAPH) pp. 365-372.

(Continued)

*Primary Examiner* — Said Broome
(74) *Attorney, Agent, or Firm* — Kilpatrick Townsend & Stockton LLP

(57) ABSTRACT

Methods and an apparatus allow animators to control the extent by which scripted character motions affect simulated objects' motions. The simulated objects are connected to the character or non-simulated object, such as clothing or hair, and the motion of the simulated objects is simulated based on the motion of the character or non-simulated object. Pose-based collision flypapering is employed to yield the proper behavior of simulated objects when those objects are pinched by surface regions of the character and/or other collision objects. In response to the pinching, a surface region is selected from the surface regions causing the pinching. Motion and position of the simulated object may be constrained to the selected surface region.

21 Claims, 5 Drawing Sheets

OTHER PUBLICATIONS

Bridson et al., "Robust Treatment of Collisions, Contact, and Friction for Cloth Animation," Computer Graphics 2002 (Proc. SIGGRAPH) pp. 594-603.

Carignan et al., "Dressing Animated Synthetic Actors with Complex Deformable Clothes," Computer Graphics 1992 (Proc. SIGGRAPH) pp. 99-104.

"CG Characters Dress for Success Thanks to Maya Cloth," PR Newswire. New York: Jul. 21, 1998. p. 1. (ProQuest Direct Copy).

Chadwick et al., "Layered Construction for Deformable Animated Characters," Computer Graphics, vol. 23, No. 3, 1989, pp. 243-252.

Choi et al., "Stable but Responsive Cloth," Computer Graphics 2002 (Proc. SIGGRAPH) pp. 604-611.

Corider et al., "Integrating Deformations Between Bodies and Clothes," The Journal of Visualization and Computer Animation, vol. 12: 45-53.

Cordier et al., "Integrated System for Skin Deformation," MIRALab, University of Geneva, pp. 2-8, Computer Animation 2000.

DeRose et al., "Subdivision Surfaces in Computer Animation," Computer Graphics 1998 (Proc. SIGGRAPH) pp. 85-94.

Ebberhardt et al., "A Fast, Flexible, Particle-System Model for Cloth Draping," IEEE Computer Graphics and Applications, 1996, vol. 16: 52-59.

Gottschalk et al., "OBBTree: A Hierarchical Structure for Rapid Interference Detection," Computer Graphics 1996 (Proc. SIGGRAPH) pp. 171-180.

Krishnan et al., "An Efficient Surface Intersection Algorithm Based on lowerDimensional formulation," ACM Transactions on Graphics 16, Jan. 1997, pp. 76-106.

Lander, Jeff, Skin Them Bones: Game Programming for the Web Generation, May 1998, Game Developer (www.gdmag.com), pp. 11-16.

Lander, Jeff, Slashing Through Real-Time Character Animation, Apr. 1998, Game Developer (www.gdmag.com), pp. 13-16.

Meyer et al., "Interactive Animation of Clothlike Objects in Virtual Reality," The Journal of Visualization and Computer Animation, 2001, vol. 12:1-12.

Patrikalakis, N., "Surface-to-Surface Intersections," IEEE Computer Graphics and Applications, 1993, vol. 13, No. 1, pp. 89-95.

Popovic et al., "Interactive Manipulation of Rigid Body Simulations" ACM, Jul. 2000, pp. 209-217.

Popovic et al., "Physically-based Motion Transformation" SIGGRAPH 99, Los Angeles, CA, Aug. 8-13, 1999, pp. 1-10.

Popovic et al., "Controlling Physics in Realistic Character Animation" ACM Jul. 2000 pp. 51-59.

Provot, X., "Deformation Constraints in a Massspring Model to Describe Rigid Cloth Behavior." Graphics Interface, 1995, pp. 147-155.

SIGGRAPH 95, "Introduction to Physically-Based Modeling" 22nd International Conferencing on Computer Graphics and International Techniques, Los Angeles, CA, Aug. 1995.

Stoeger, T., J. Ramsey and D. Brinsmead, "How to Create Long Hair With Maya Paint Effects and Maya Cloth", Alias/Wavefront, Corporate Overview, 4 pages.

Terzopoulos et al., "Deformable Models," Visual Computer 4, 1988, pp. 306-331.

Terzopoulos et al., "Elastically Deformable Models," Computer Graphics 1987 (Proc. SIGGRAPH) 11: 205-214.

Thalmann et al., "Virtual Clothes, Hair and Skin for Beautiful Top Models" IEEE 1996, pp. 132-141.

Volino et al., "Versatile and Efficient Techniques for Simulating Cloth and Other Deformable Objects," Computer Graphics 1995 (Proc. SIGGRAPH), pp. 137-144.

Watt et al., "Advanced Animation and Rendering Techniques," ACM Press, 1992, pp. 418-420.

Westenhofer et al., "Using Kinematic Clones to Control the Dynamic Simulation of Articulated Figures," 1999, pp. 26-35, Rhythm & Hues Studio, Los Angeles, CA.

* cited by examiner

POSE-BASED COLLISION FLY-PAPERING: A METHOD FOR SIMULATING OBJECTS IN COMPUTER ANIMATION

CROSS-REFERENCES TO RELATED APPLICATIONS

This application claims the benefit of and priority to U.S. Provisional Patent Application No. 60/812,310, filed Jun. 8, 2006 and entitled "Pose-Based Collison Flypapering: A Method of Simulating Objects in Computer Animation," the entire disclosure of which is herein incorporated by reference for all purposes.

This application is related to U.S. patent application Ser. No. 09/794,057, filed Feb. 28, 2001, now U.S. Pat. No. 6,657,629 and entitled "Collision Flypapering: A Method For Defining Realistic Behavior For Simulated Objects In Computer Animation," and U.S. patent application Ser. No. 10/636,514, filed Aug. 6, 2003 and entitled "Collision Flypapering: A Method For Defining Realistic Behavior For Simulated Objects In Computer Animation," the disclosures of which are herein incorporated by reference for all purposes.

BACKGROUND OF THE INVENTION

The present invention relates to computer graphics. More specifically, the present invention relates to techniques for simulating the relative motion of objects. The present invention is also directed to providing animators with greater control over aspects of simulated objects associated with a character to produce proper changes in those elements even when the simulated objects are "pinched" between non-simulated objects, such as, for example, elements of the character.

Traditional animation techniques allow the animator to create the apparent motion of animated characters, to be viewed by a viewer of the animation. The use of computers to simplify the animation process has provided many benefits to the traditional hand-drawn process. Computer-animated characters are well known in the prior art and have been used in many different capacities. Such characters are utilized in traditional movies, videos, and online streaming of moving pictures, as well as interactive movies where the motion of characters is often initiated by a user.

Often times in the animation of characters, the characters have "simulated objects or elements," such as clothing and hair, that are responsive to the main motion of the characters. The motions of some secondary or simulated elements in computer graphics imagery are often too complex for an animator to directly control. Instead of a human animator determining the motion of these simulated elements, computer programs use physically-based numerical methods that simulate the motion of these simulated elements (such as hair or cloth) over time.

This is accomplished by modeling the physical properties of these dynamic elements (how the cloth bends due to forces or collisions with solid objects, how the hair deforms or collides with itself, the external forces on these simulated objects (gravity, wind) and the motions of the non-simulated objects (for example, the characters that cloth rests on or that the hair grows out of). The animation of the non-simulated objects is provided by the animator and is independent of and unaffected by anything that the simulated objects do.

One of the hardest aspects of the computer simulation is making the simulated objects react appropriately to collisions with the non-simulated objects. A typical scenario is for an animator to animate the motions of a character, and then use a simulation to automatically produce motion for the character's clothing, for example. From the simulation program's viewpoint, the character's motion is predetermined; the simulation program's task is to make the clothing respond to collision and contact with the character as the character moves about.

Difficulties arise when the character's motion causes the simulated objects to become pinched between two or more surfaces of the character. Up until now, simulation programs have not been able to deal correctly with simulated objects caught in such pinch regions. Correcting the underlying animation so that it is free from physically unrealistic pinches is time-consuming for an animator, and often prohibitively expensive.

For example, consider a character having simulated pants. As the character squats, the simulated pants become pinched between regions near the character's knees. Typically, the character's legs actually intersect as she squats. This pinching behavior raises a serious problem: where should simulated particles pinched between intersecting objects go?

Prior art methods have not been able to remedy the problems discussed above. For example, MAYACLOTH, from Alias-Wavefront, owned by SGI of Toronto, Canada, is a software implemented 3D cloth modeler for dressing and animating 3D characters. Clothing parameters are controllable by parameters which allow for garments composed of multiple fabrics and the garments can respond to wind, gravity and the underlying motion of the characters.

However, MAYACLOTH tries to resolve pinching by letting the user arbitrarily pick one surface to pay attention to and ignoring the other surfaces. The program's attempts to work around the problem of pinching do not work very well.

Accordingly, what is desired are improved methods and apparatus for solving the problems discussed above, while reducing the drawbacks discussed above.

BRIEF SUMMARY OF THE INVENTION

The present invention relates to computer graphics. More specifically, the present invention relates to techniques for simulating the relative motion of objects. The present invention is also directed to providing animators with greater control over aspects of simulated objects associated with a character to produce proper changes in those elements even when the simulated objects are "pinched" between non-simulated objects, such as, for example, elements of the character.

In various embodiments, a method for simulating relative motion of objects includes receiving information indicating that a simulated object is being pinched by a set of surface regions associated with one or more reference objects. A surface region is selection from the set of surface regions. The simulated object is then constrained to the selected surface region.

In some embodiments, constraining the simulated object to the selected surface region includes constraining motion of the simulated object. Constraining the simulated object to the selected surface region may include constraining position of the simulated object. Constraining the simulated object to the selected surface region may also include constraining the simulated object substantially near the selected surface region to follow shape of the selected surface region.

In one embodiment, receiving information indicating that the simulated object is being pinched includes receiving information indicating that the simulated object is substantially in contact with a first surface region and substantially in contact with a second surface region. In various embodiments, a difference may be determined between velocities of the set of surface regions and velocity of a reference motion.

Selecting the surface region from the set of surface regions may include selecting a surface region whose velocity is closest to the velocity of the reference motion from the set of surface regions.

In further embodiments, a mapping is received between the simulated object and a reference location. Each of the set of surface regions may be ranked according to motion of each surface region. Selecting the surface region from the set of surface regions may include selecting a surface region whose motion substantially matches motion of the reference location from the set of surface regions. The simulated object may be a cloth object. The simulated object may be a hair object.

In various embodiments, a computer program product is stored on a computer readable medium for simulating relative motion of objects. The computer program product includes code for receiving information indicating that a simulated object is being pinched by a set of surface regions associated with one or more reference objects, code for selecting a surface region from the set of surface regions, and code for constraining the simulated object to the selected surface region.

In one embodiment, a system for simulating relative motion of objects includes a processor and a memory. The memory is coupled to the processor and configured to store a set of instructions which when executed by the processor configure the processor to receive information indicating that a simulated object is being pinched by a set of surface regions associated with one or more reference objects, select a surface region from the set of surface regions, and constrain the simulated object to the selected surface region.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 2A is a screenshot depicting the character in a standing position. FIG. 2B is a screenshot depicting the character as the character squats down. FIG. 2C is a screenshot depicting the character fully crouched down.

FIG. 3A is a screen shot depicting the profile side view of the character. FIG. 3B is a screen shot depicting a close-up cut-away view showing cloth fly-papered between the legs of the animated character.

DETAILED DESCRIPTION OF THE INVENTION

The present invention relates to computer graphics. More specifically, the present invention relates to techniques for simulating the relative motion of objects. The present invention is also directed to providing animators with greater control over aspects of simulated objects associated with a character to produce proper changes in those elements even when the simulated objects are "pinched" between non-simulated objects, such as, for example, elements of the character.

In various embodiments, simulated objects are elements of a computer animation display. The computer animation display may include simulated objects (e.g., secondary or dynamic object) such as cloth, garments and clothing, hair, and fur. The computer animation display may further include reference objects (e.g., kinematic, non-simulated objects, or other simulated objects), such as characters and/or collision objects.

Typically, simulated objects are model, described, or represented as a collection of particles, connected to each other in some manner. In one example, a topological mesh is used in the case of clothing. In another example, a collection of strands or linear objects are used to describe hair or fur. According to various embodiments, techniques are provided that allow a simulation computer program to better display in visually desirable manners simulated objects that response to changes in motions and positions of reference or non-simulated objects.

In some embodiments, a method is provided for controlling the dynamic simulation of simulated objects pinched between one or more surface regions of reference objects or non-simulated objects. In general, the simulated objects are elements such as cloth, clothing, hair or fur associated with reference or non-simulated objects, such as characters and/or collision objects. Pose-based collision flypapering allows a computer simulation program to realistically handle collisions between a simulated object (e.g., particles of a cloth garment) and one or more reference or non-simulated objects that the simulated object encounters.

Figure 1:
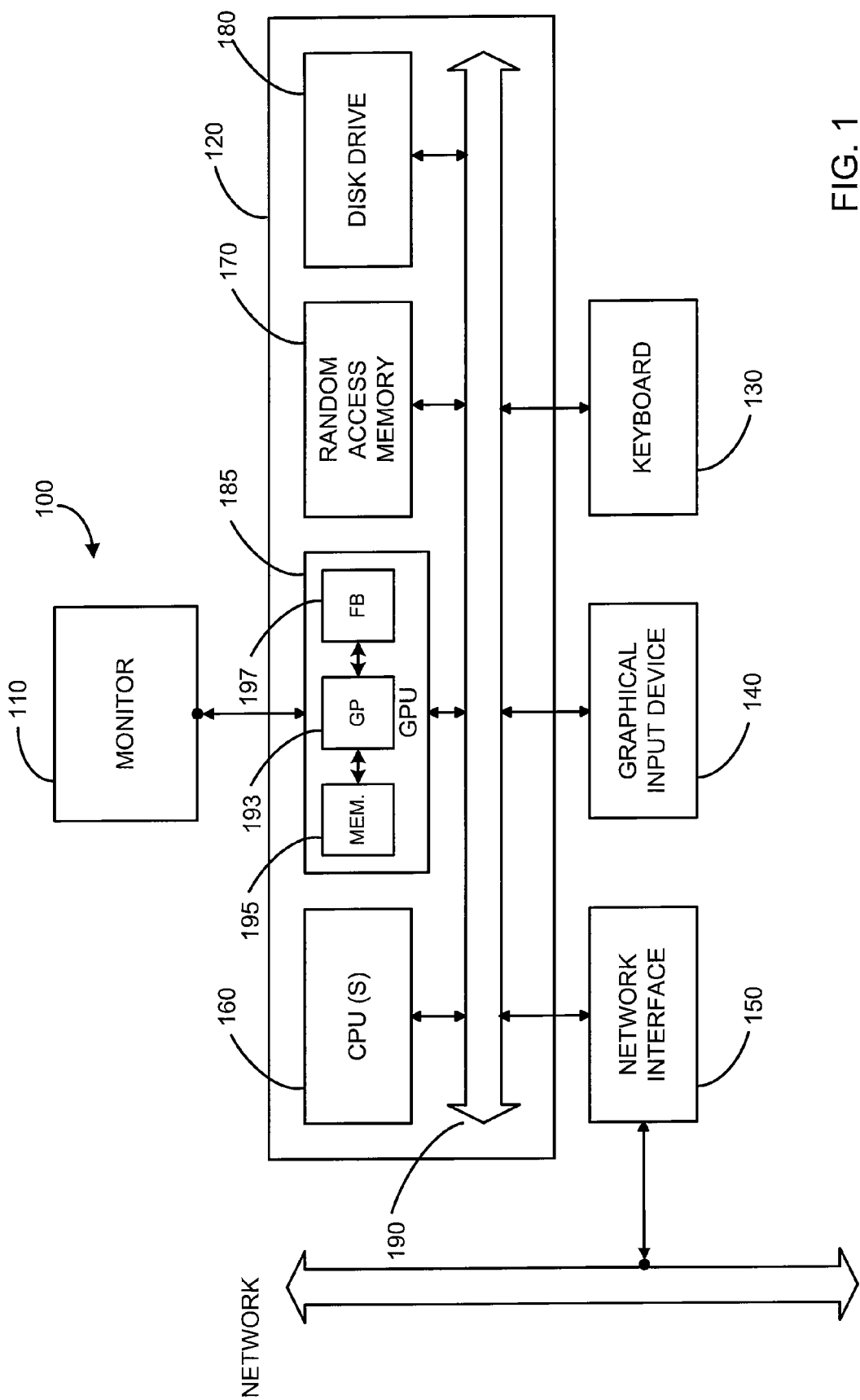
FIG. 1 is a block diagram of a computer system that may be used to practice embodiments of the present invention.

FIG. 1 is a block diagram of a computer system 100 that may be used to practice embodiments of the present invention. FIG. 1 is merely illustrative of an embodiment incorporating the present invention and does not limit the scope of the invention as recited in the claims. One of ordinary skill in the art would recognize other variations, modifications, and alternatives.

In one embodiment, computer system 100 typically includes a monitor 110, computer 120, a keyboard 130, a user input device 140, computer interfaces 150, and the like.

In various embodiments, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, and may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In some embodiment, computer 120 includes one or more Xeon microprocessors from Intel. Further, one embodiment, computer 120 includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In this example, GPU 185 includes a graphics processor 193, a number of memories and/or registers 195, and a number of frame buffers 197.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In various embodiments, computer system 100 provides pose-based collision flypapering that enables a good solution to the problems discussed above even when a non-simulated objects' motion are grossly implausible. In general, one common component of physically-based simulation systems is the imposition of constraints on the objects being simulated. In various embodiments, the constraints imposed on a simulated object are due to collisions. For example, particles making up a simulated object may need to be constrained when the particles collide with surface regions of reference or non-simulated objects. An example of this would be cloth (e.g., a simulated object) on a young girl character (e.g., a reference or non-simulated object), shown in FIGS. 2A, 2B, and 2C, as the cloth collides with the young girl character.

Figures 2A, 2B, 2C:
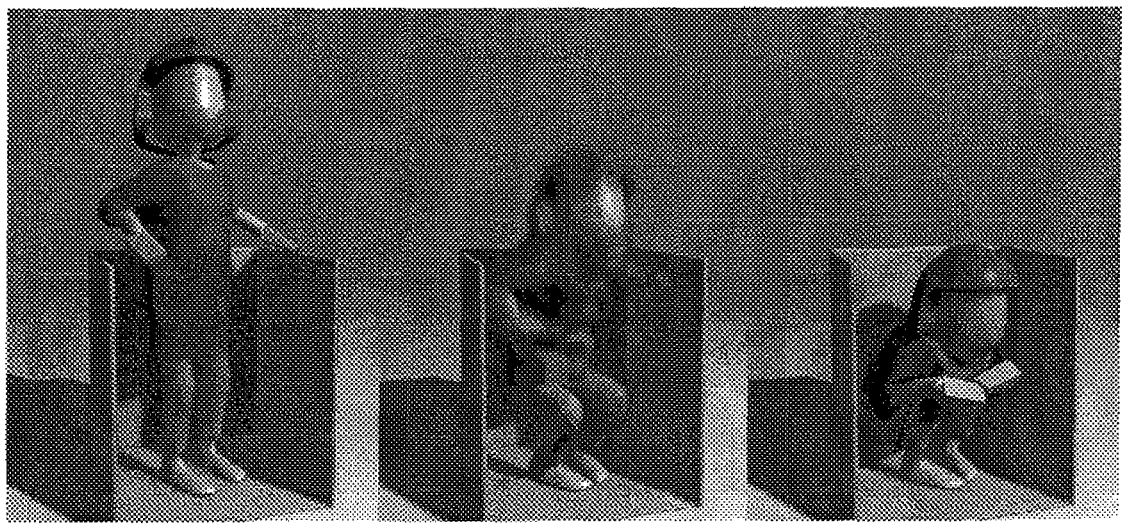
FIGS. 2A, 2B, and 2C are screenshots depicting an animated character in one embodiment according to the present invention.

FIGS. 2A, 2B, and 2C are screenshots depicting an animated character in one embodiment according to the present invention. FIG. 2A is a screenshot depicting the character in a standing position. FIG. 2B is a screenshot depicting the character as the character squats down. As the character squats, simulated pants become pinched between regions near the character's knees. FIG. 2C is a screenshot depicting the character fully crouched down.

Figures 3A, 3B:
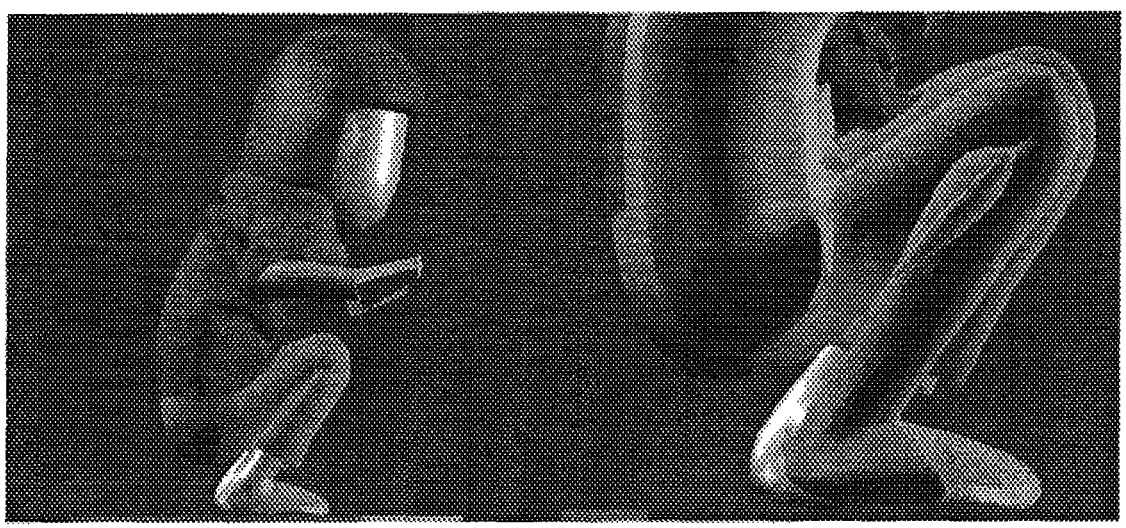
FIGS. 3A and 3B are screenshots depicting side views of the character of FIG. 2C in one embodiment according to the present invention.

FIGS. 3A and 3B are screenshots depicting side views of the character of FIG. 2C in one embodiment according to the present invention. FIG. 3A is a screen shot depicting the profile side view of the character. A closer look, shown in profile in FIG. 3B, reveals that the character's legs (e.g., surface regions) actually intersect as she squats.

As shown therein, there is a physically impossible intersection between the legs near the knees. Thus, in various embodiments, computer system 100 produces a response resulting in the cloth neatly lying midway between the intersecting leg areas. In further embodiments, computer system 100 enables the cloth to be automatically constrained to a surface region (e.g., constrained to either one of the legs to lay neatly midway between), while also allowing the cloth to have freedom of movement to "skate around" on the surface region. In some embodiments, computer system 100 constrains the cloth based on motion and/or position of a reference location, or a reference motion, such that the cloth is constrained to a surface region that has motion closest to or best matches motion of the reference location or reference motion.

Consider an example of a young girl character (e.g., the young girl character of FIG. 2A), wearing a shirt. The underarm portion of the shirt next to the young girl character body may become pinched between a surface region of the arm (e.g., the underarm) and a surface region of the body (e.g., the torso) due to the back and forth motion of the character's arms during walking. The back and forth motion of the arm surface region and/or the torso surface region, and the pinching, cause the underarm portion of the shirt to move with the surface region performing the pinching.

For example, forward motion of the arm causes the underarm portion of the shirt to fold and wrinkle not only in the direction of the motion from back to front, but also to lift away from the body of the character. Similarly, backward motion of the arm causes the underarm portion of the shirt to fold and wrinkle not only in the direction of the motion from front to back, but again to lift away from the body of the character. Often, the effects of the lifting away in response to the pinching cause visually undesirable effects on the look of the clothing.

Accordingly, in various embodiments, computer system 100 determines motion of a simulated object relative to motions of one or more "pinching" surface regions associated with one or more reference or non-simulated objects based on motion of a reference location or reference motion. Computer system 100 then constrains the simulated object to a surface region that best matches or is closest to a feature of the reference location or motion of a reference motion. For example, computer system 100 may constrain the simulated object to a surface region whose motion, velocity, acceleration, direction, position, etc., is substantially the same or closest to motion, velocity, acceleration, direction, position, etc. of a reference point or location.

This allows computer system 100 to pick or choose a surface region, and allow the simulated object to "skate around" or move freely on the selected surface region as influenced by motions of the pinching surface regions. Computer system 100 may also constrained the simulated object to the selected surface region such that the simulated object does not come off the surface region. Thus, in some embodiments, computer system 100 allows the simulated object freedom of motion on the constrained surface, but prevents visually displeasing puckering, wrinkling, or other visually displeasing motion of the simulated object as if the simulated object was "glued" to each of the pinching surface regions.

Figure 4:
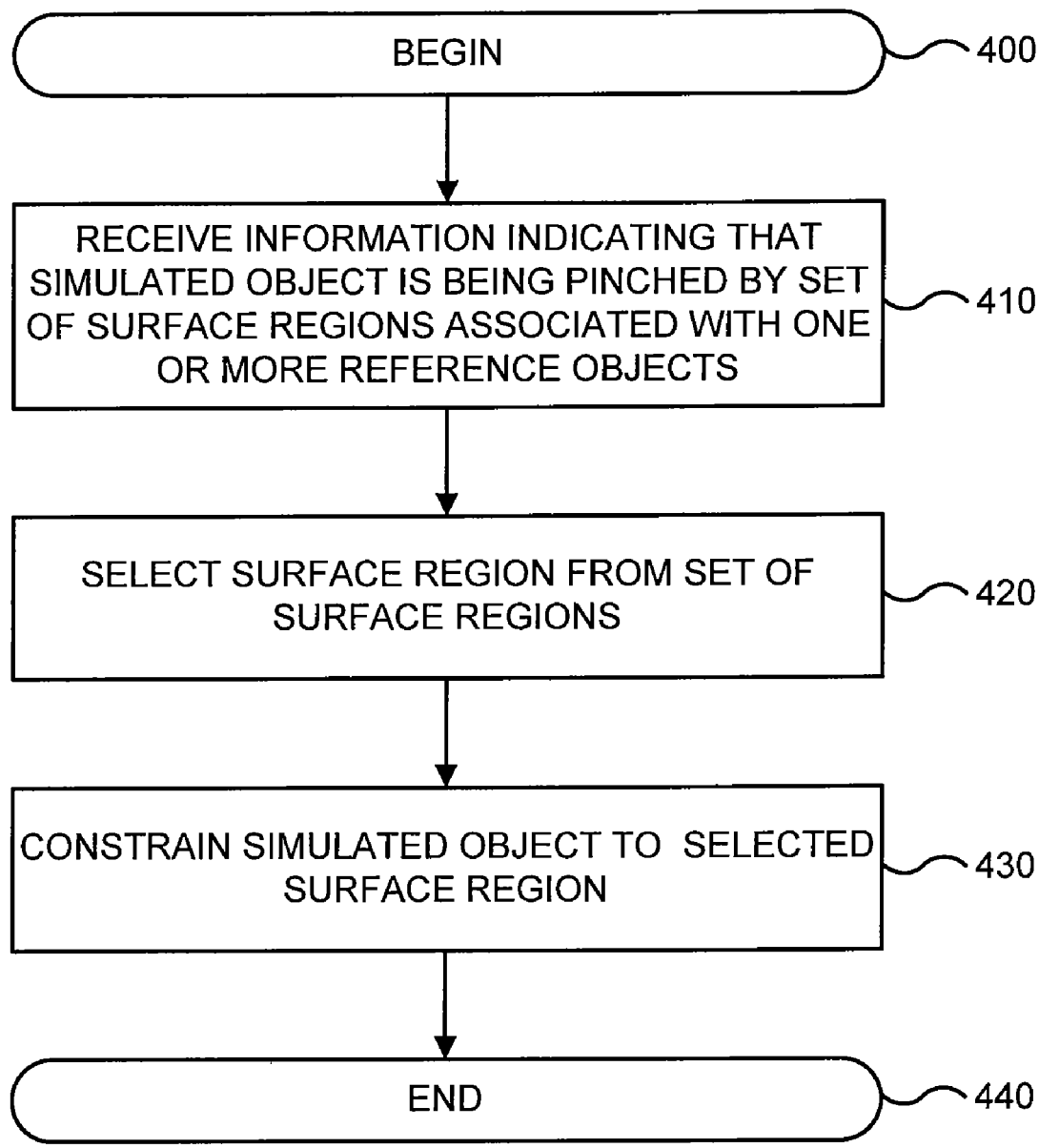
FIG. 4 is a simplified flowchart of a method for simulating relative motion of an object using pose-based collision flypapering in one embodiment according to the present invention.

FIG. 4 is a simplified flowchart for simulating relative motion of objects in one embodiment according to the present invention. The processing depicted in FIG. 4 may be performed by software modules (e.g., instructions or code) executed by a processor of a computer system, by hardware modules of the computer system, or combinations thereof. FIG. 4 begins in step 400.

In step 410, computer system 100 receives information indicating that a simulated object is being pinched by a set of surface regions associated with one or more reference objects. For example, an animator may provide motion of a reference object or non-simulated object, such as a character. Simulated objects, such a clothing or hair are then associated with the non-simulated object. In general, motions and positions of simulated objects are influenced by motions and positions of reference or non-simulated objects. The motions and positions of a simulated object typically are simulated using a physically-based numerical technique.

A pinching operates on a simulated object whenever the simulated object collides with two or more surface regions. A collision may be detected when the simulated object (or a portion thereof) is in contact with, is substantially in contact with, or is within a predetermined threshold or distance of a surface region. A surface region is any portion of a surface or set of surfaces. For example, a surface region may be a point on or near a surface, a particle associated with a surface, a set of points or particles, and the like.

Some examples of a pinching are when a character kneels or bends. Other examples of pinching are when a character is in motion, clothing is pinched between an arm of the character and the body of the character. Pinching may occur when a first surface region is stopped or not in motion, and a second surface region is stopped. Pinching may occur when at least one surface region is stopped, and when at least one surface region is in motion. Pinching may also occur when a first surface region is in motion, and a second surface region is in motion.

In step 420, computer system 100 selects a surface region from the set of surface regions. For example, computer system 100 may select one or more surface regions associated with one or more reference objects whose motion best matches or is closest to a desired motion for the simulated object. In another example, computer system 100 selects one or more surface regions of a reference or non-simulated object from a set of surface regions whose motions are ranks in an order, the one or more surface regions having motion corresponding to, equivalent to, or closest to motion of a reference location (e.g., another surface region) or a reference point associated with the reference or simulated object (e.g., such as provided during pose-time or bind-time).

In step 430, computer system 100 constrains the simulated object to the selected surface region. For example, computer system 100 may constrain motion of the simulated object to the selected surface region. In another example, computer system 100 may constrain position of the simulated object to the selected surface region. In yet another example, computer system 100 may constrain the simulated object to follow the shape of the selected surface region. Thus, computer system 100 may allow the simulated object (e.g., a cloth object) to potentially skate around or move around freely on the reference object (e.g., the skin of a human character), while restricting or constraining the simulated object from moving away from or intersecting with reference object. FIG. 4 ends is step 440.

In various embodiments, the position in space of a simulated object (e.g., a particle forming the simulated object) as a function of time is denoted by $p(t) \in \Re^3$. Given a simulated particle colliding with one or more non-simulated objects at some time $t_0$, the only assumption needed is to describe positions the particle is allowed to be in at future times $t_0 + \Delta t$, for some short duration of time $\Delta t$. It is the simulator's job to make sure that the particle moves so that its position $p(t_0 + \Delta t)$ at each time $t_0 + \Delta t$ is legal. Without requiring any particular representation, a non-simulated reference or collision surface that a particle might collide with will simply be denoted as S.

When a particle collides with a collision surface S at time $t_0$, the particle's motion forward in time must be constrained. The constraint is that the particle position p(t) must lie on or outside of S for $t > t_0$. The surfaces are oriented such that a surface S divides space into an "inside" and an "outside." The collision constraint allows the particle 2½ degrees of freedom; the particle can wander freely about the surface S (two degrees of freedom), or to "detach" and move away from the surface (another half-degree of freedom). Of course, while in contact with S, other influences (friction, attachments to other particles) may further proscribe the particle's freedoms.

Referring again to FIGS. 2A, 2B, and 2C, cloth particles on the girl's arms may remain on the arms, or they may move away from the arms; once they move some distance away from the arms, these particles remain unconstrained until they contact another collision surface. The only thing the particles may not do while in contact with the arms is to move inside the arms.

A constraint that removes a half-degree of freedom from a particle works well when the particle collides with a single surface. When a particle contacts multiple surfaces however, and the simulator determines that the particle is "pinched" between the surfaces, such a constraint present difficulties.

Pose-based collision flypapering begins with the premise of a pinched particle. Accordingly, such particles are subject to a constraint that removes some, but not all, of the particle's degrees of freedom. Pose-based collision flypapering operates on a particle whenever the particle is pinched by two or more surfaces. When the pinch goes away, the particle stops being flypapered. The simulator is responsible for deciding whether or not a particle should actually be flypapered. Pose-based collision flypapering is only responsible for the decision of how a particle should behave once the simulator decides the particle should be flypapered.

Figure 5A:
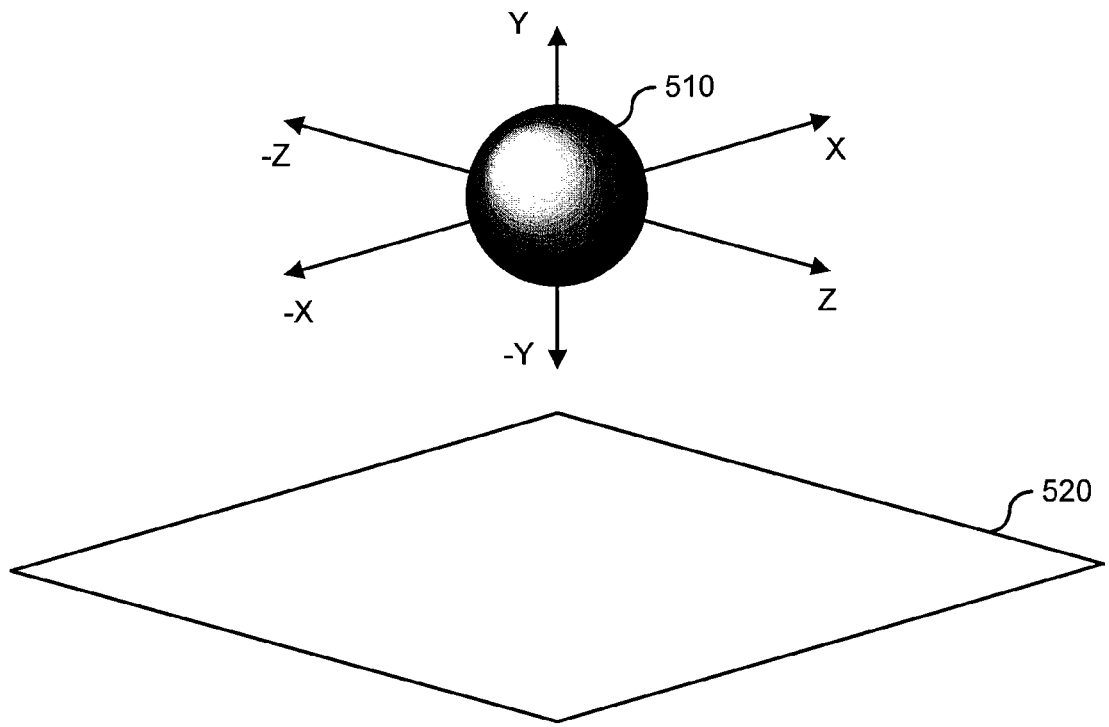
FIGS. 5A and 5B are block diagrams illustrating a simulated object before and after being constrained to a surface region associated with a reference object in one embodiment according to the present invention.
Figure 5B:
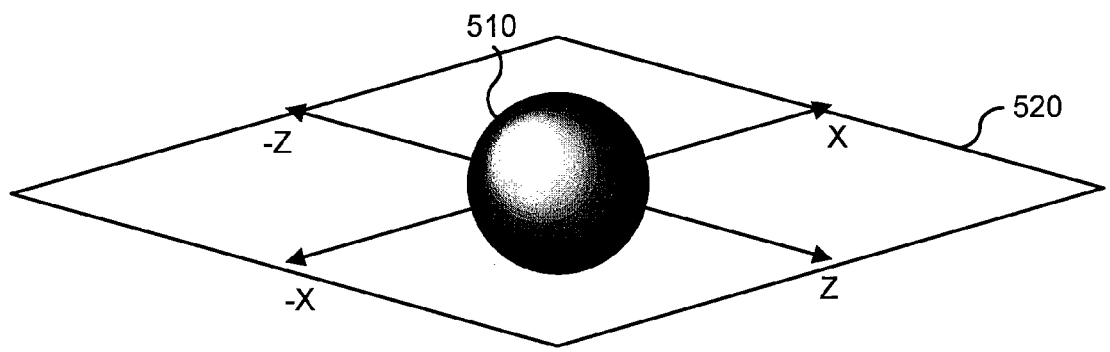

FIGS. 5A and 5B are block diagrams illustrating a simulated object (e.g., point 510) before and after being constrained to a surface region 520 associated with a reference object in one embodiment according to the present invention. FIG. 5A includes simulated point 510 and surface region 510. Simulated point 510 may be a cloth object, a hair or linear object, or a portion of a secondary or dynamic object. Simulated object may include a set of simulated object. Surface region 520 may be a character object, or a portion of a reference or non-simulated object.

In this example, simulated point 510 has three degrees of freedom. For example, simulated point 510 may move in both the positive and negative directions along an X-axis, a Y-axis, and a Z-axis of a coordinate system. This constitutes three degrees of freedom. Other dimensions or degrees of freedom may exist, however only three are shown for the sake of simplicity.

Referring now to FIG. 5B, computer system 100 constrains simulated point 510 to surface region 520 in response to a pinching involving surface region 510. Computer system 100 constrains simulated point 510 to surface region 520 such that simulated point 510 is prevented from moving in the positive or negative directions along the Y-axis. Simulated point 510, though, is allowed to move along both the positive and negative directions of the X-axis and the Y-axis. In other words, simulated object is free to skate around on surface region 510 and follow its shape, but is not allowed to move off of surface region 520. This constitutes two degrees of freedom. Accordingly, simulated point 510 can skate around on surface region 520 without visually displeasing puckering, wrinkling, or other visually displeasing motion of the simulated object that may occur by the pinching caused by surface region 520.

Figure 6:
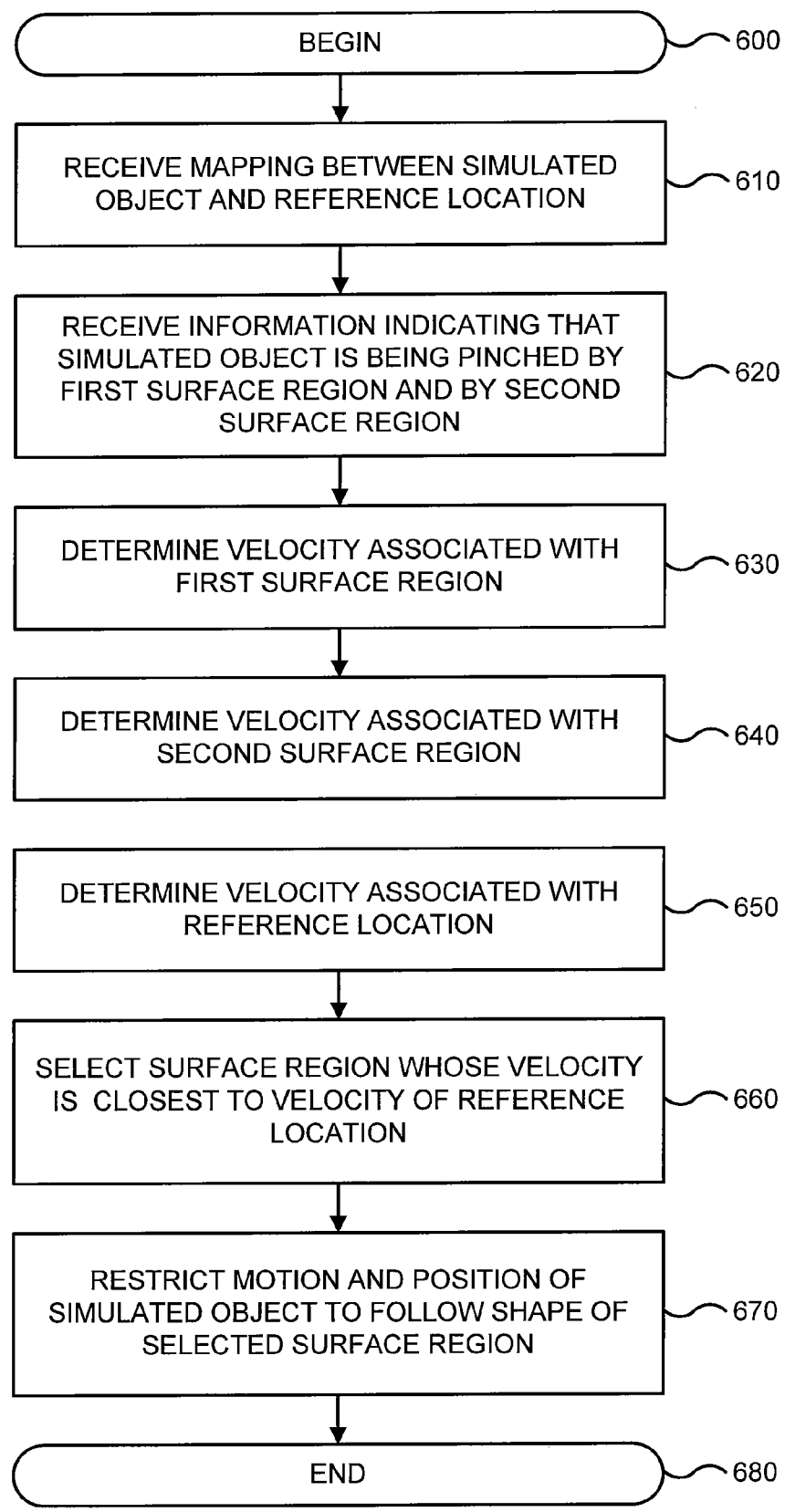
FIG. 6 is a flowchart of a method for simulating relative motion of an object using pose-based collision flypapering in one embodiment according to the present invention.

FIG. 6 is a flowchart of a method for simulating objects using pose-based flypapering in one embodiment according to the present invention. FIG. 6 begins in step 600.

In step 610, computer system 100 receives a mapping between a simulated object and a reference location associated with a reference or non-simulated object. For example, an animator may use computer system 100 to pose a human character. At pose-time, the animator places a cloth garment (i.e., a simulated object) on the human character, and computer system 100 maps or otherwise associates each particle of the cloth garment to the closest point on the human character's skin. The closest point on the human character's skin becomes the reference point or reference location for each particle of the cloth garment. In some embodiments, motion of the closest reference point or reference location becomes the reference motion for the particle.

In step 620, computer system 100 receives information indicating that a simulated object is being pinched by a first surface region and by a second surface region. The first surface region may be part of a first surface, and the second surface region may be part of a second surface. The first surface region and the second surface region may be part of the same surface. Furthermore, the first surface region and the second surface region may be part of a single reference object or different reference objects.

In step 630, computer system 100 determines velocity associated with the first surface region. For example, computer system 100 may determine motion and direction of a point on the first surface region, to calculate a value associated with velocity of the first surface region. In another example, computer system 100 may determine a value associated with velocity of a set of points on the first surface region.

In step 640, computer system 100 determines velocity associated with the second surface region. In step 650, computer system 100 determines velocity associated with the reference location. In step 660, computer system 100 selects a surface region whose velocity is closest to velocity of the reference location. For example, if the velocity at the first surface region is closest to the velocity of the reference location, computer system 100 selects or otherwise identifies the first surface region to which the simulated object is to be constrained.

In step 670, computer system 100 restricts motion and position of the simulated object to follow the shape of the selected surface region. For example, referring to FIG. 5B, computer system 100 may restrict motion and position of simulated point 510 according to a half degree of freedom, thereby preventing simulated point 510 for moving away from surface 520. Thus, in this example, computer system 100 allows simulated point 510 to move around freely according to degrees of freedom in the positive and negative X-axis and Z-axis, while restricting simulated point 510 from moving away from surface region 520 (or intersecting with surface region 520). FIG. 6 ends in step 680.

Accordingly, in various embodiments, computer system 100 determines motion and position of a simulated object relative to motions of one or more "pinching" surface of a non-simulated object based on motion of a reference location on a reference or non-simulated object. Computer system 100 constrains motion of the simulated object to a selected surface region of the reference object that best matches or is closest to the motion of the reference location. Computer system 100 thus allows the simulated object to "skate around" or move freely on the surface, but does not allow the simulated object to come off the surface. Thus, in some embodiments, computer system 100 allows the simulated object freedom of motion on the constrained surface region, but prevents visually displeasing puckering, wrinkling, or other visually displeasing motion of the simulated object.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for simulating relative motion of objects, the method comprising:

receiving, at one or more computer systems that simulate motion of objects, a correspondence between a simulated object whose motion is determined from simulations of the simulated object and a reference location associated with one or more reference objects, the correspondence being established prior to a simulation of the simulated object;

receiving, at the one or more computer systems, information indicating that the simulated object is being pinched by a set of surface regions associated with the one or more reference objects;

ranking each of the set of surface regions according to motion of each surface region;

selecting, with one or more processors associated with the one or more computer systems, a surface region of at least one of the one or more reference objects from the set of surface regions associated with the one or more reference objects whose motion matches motion of the reference location based on the correspondence between the simulated object and the reference location associated with the one or more reference objects; and constraining, with the one or more processors associated with the one or more computer systems, the simulated object to the selected surface region of the at least one of the one or more reference objects.

2. The method of claim 1 wherein constraining the simulated object to the selected surface region comprises constraining motion of the simulated object.

3. The method of claim 1 wherein constraining the simulated object to the selected surface region comprises constraining position of the simulated object.

4. The method of claim 1 wherein constraining the simulated object to the selected surface region comprises constraining the simulated object near the selected surface region to follow shape of the selected surface region.

5. The method of claim 1 wherein receiving information indicating that the simulated object is being pinched comprises receiving information indicating that the simulated object is in contact with a first surface region and substantially in contact with a second surface region.

6. The method of claim 1 wherein the simulated object comprises a cloth object.

7. The method of claim 1 wherein the simulated object comprises a hair object.

8. A non-transitory computer-readable medium storing code executable by one or more computer systems for simulating relative motion of objects, the computer-readable medium comprising:

code for receiving a correspondence between a simulated object whose motion is determined from simulations of the simulated object and a reference location associated with one or more reference objects, the correspondence being established prior to a simulation of the simulated object;

code for receiving information indicating that the simulated object is being pinched by a set of surface regions associated with the one or more reference objects;

code for ranking each of the set of surface regions according to motion of each surface region;

code for selecting a surface region of at least one of the one or more reference objects from the set of surface regions associated with the one or more reference objects whose motion matches motion of the reference location based on the correspondence between the simulated object and the reference location associated with the one or more reference objects; and code for constraining the simulated object to the selected surface region of the at least one of the one or more reference objects.

9. The non-transitory computer-readable medium of claim 6 wherein the code for constraining the simulated object to the selected surface region comprises code for constraining motion of the simulated object.

10. The non-transitory computer-readable medium of claim 6 wherein the code for constraining the simulated object to the selected surface region comprises code for constraining position of the simulated object.

11. The non-transitory computer-readable medium of claim 6 wherein the code for constraining the simulated object to the selected surface region comprises code for constraining the simulated object near the selected surface region to follow shape of the selected surface region.

12. The non-transitory computer-readable medium of claim 6 wherein the code for wherein the code for receiving information indicating that the simulated object is being pinched comprises code for receiving information indicating that the simulated object is in contact with a first surface region and in contact with a second surface region.

13. The non-transitory computer-readable medium of claim 6 wherein the simulated object comprises a cloth object.

14. The non-transitory computer-readable medium of claim 6 wherein the simulated object comprises a hair object.

15. A system for simulating relative motion of objects, the system comprising:

a processor: and a memory coupled to the processor, the memory configured to store a set of instructions which when executed by the processor configure the processor to:

receive a correspondence between a simulated object whose motion is determined from simulations of the simulated object and a reference location associated with one or more reference objects, the correspondence being established prior to a simulation of the simulated object;

receive information indicating that the simulated object is being pinched in the simulation by a set of surface regions associated with the one or more reference objects;

rank each of the set of surface regions according to motion of each surface region;

select a surface region of at least one of the one or more reference objects from the set of surface regions associated with the one or more surface regions whose motion matches motion of the reference location based on the correspondence between the simulated object and the reference location associated with the one or more reference objects; and constrain the simulated object to the selected surface region of the at least one of the one or more reference objects.

16. The system of claim 15 wherein the processor is configured to constraining motion of the simulated object to constrain the simulated object to the selected surface region.

17. The system of claim 15 wherein the processor is configured to constrain position of the simulated object to constrain the simulated object to the selected surface region.

18. The system of claim 15 wherein the processor is configured to constrain the simulated object near the selected surface region to follow shape of the selected surface region to constrain the simulated object to the selected surface region.

19. The system of claim 15 wherein the processor is configured to receive information indicating that the simulated object is in contact with a first surface region and in contact with a second surface region to receive information indicating that the simulated object is being pinched.

20. The system of claim 15 wherein the simulated object comprises a cloth object.

21. The system of claim 15 wherein the simulated object comprises a hair object.

* * * * *